United States Patent
Hahn et al.

(10) Patent No.: US 12,008,896 B2
(45) Date of Patent: Jun. 11, 2024

(54) SYSTEM AND METHOD FOR DETECTION AND QUANTIFICATION OF IRREGULAR TRAFFIC CONGESTION

(71) Applicant: WAYCARE TECHNOLOGIES LTD., Tel Aviv (IL)

(72) Inventors: Idan Hahn, Haifa (IL); Alex Smolyak, Kiryat Ono (IL)

(73) Assignee: WAYCARE TECHNOLOGIES LTD., Tel Aviv (IL)

( * ) Notice: Subject to any disclaimer, the term of this patent is extended or adjusted under 35 U.S.C. 154(b) by 107 days.

(21) Appl. No.: 17/405,042

(22) Filed: Aug. 18, 2021

(65) Prior Publication Data
US 2021/0375128 A1 Dec. 2, 2021

Related U.S. Application Data

(63) Continuation of application No. 16/247,608, filed on Jan. 15, 2019, now Pat. No. 11,100,793.

(51) Int. Cl.
*G08G 1/01* (2006.01)
*G06F 17/18* (2006.01)
(Continued)

(52) U.S. Cl.
CPC ........... *G08G 1/0145* (2013.01); *G06F 17/18* (2013.01); *G06N 3/08* (2013.01); *G06N 5/046* (2013.01);
(Continued)

(58) Field of Classification Search
CPC .. G08G 1/0145; G08G 1/0129; G08G 1/0133; G08G 1/0116; G08G 1/012;
(Continued)

(56) References Cited

U.S. PATENT DOCUMENTS

| | | |
|---|---|---|
| 8,090,524 B2 | 1/2012 | Craig et al. |
| 9,536,425 B1 | 1/2017 | James et al. |

(Continued)

FOREIGN PATENT DOCUMENTS

| | | |
|---|---|---|
| CN | 105938655 | 9/2016 |
| EP | 2341493 | 6/2011 |

(Continued)

OTHER PUBLICATIONS

International Search Report for PCT Application No. PCT/IL2020/050063 dated May 10, 2020.

(Continued)

*Primary Examiner* — Sze-Hon Kong
(74) *Attorney, Agent, or Firm* — Crowell & Moring LLP

(57) ABSTRACT

A system and a method of detecting and handling traffic congestion outliers by at least one processor. Embodiments of the present invention may include: receiving, from a plurality of information sources, data corresponding to at least one temporal, local traffic property; producing a local, time-based traffic profile based on the received data; receiving, from at least one information source, new data corresponding to at least one temporal, local traffic property; analyzing the new data in relation to at least one respective time-based traffic profile, to produce a score of the new data; and if the score surpasses a threshold, then identifying the data as originating from a local, temporal traffic congestion outlier and producing at least one recommendation for handling the traffic congestion outlier.

21 Claims, 10 Drawing Sheets

(51) Int. Cl.
G06N 3/08 (2023.01)
G06N 5/046 (2023.01)
G06N 20/00 (2019.01)

(52) U.S. Cl.
CPC ............ G06N 20/00 (2019.01); G08G 1/0129 (2013.01); G08G 1/0133 (2013.01)

(58) Field of Classification Search
CPC ............ G08G 1/02; G08G 1/04; G08G 1/042; G08G 1/0112; G06F 17/18; G06N 3/08; G06N 5/046; G06N 20/00; G06N 3/045; G06N 7/01
See application file for complete search history.

(56) References Cited

U.S. PATENT DOCUMENTS

| | | | |
|---|---|---|---|
| 9,613,529 | B2 | 4/2017 | Oliver et al. |
| 9,646,428 | B1 | 5/2017 | Blake et al. |
| 10,108,912 | B1 | 10/2018 | Conroy |
| 2005/0240340 | A1* | 10/2005 | Ishikawa ............ G08G 1/0104 340/995.13 |
| 2011/0173015 | A1 | 7/2011 | Chapman et al. |
| 2012/0072096 | A1 | 3/2012 | Craig et al. |
| 2013/0166188 | A1 | 6/2013 | Zheng et al. |
| 2014/0289284 | A1 | 9/2014 | Joshua et al. |
| 2015/0211871 | A1* | 7/2015 | Jeong ............... G08G 1/096816 701/522 |
| 2015/0221218 | A1 | 8/2015 | Downs et al. |
| 2016/0047666 | A1 | 2/2016 | Fuchs |
| 2016/0117921 | A1 | 4/2016 | Anthony et al. |
| 2016/0203713 | A1 | 7/2016 | Colonna |
| 2016/0284212 | A1* | 9/2016 | Tatourian ......... G08G 1/096775 |
| 2016/0343087 | A1 | 11/2016 | Dange |
| 2017/0098181 | A1 | 4/2017 | Shawn et al. |
| 2017/0345294 | A1* | 11/2017 | Hirotsu ................ G08G 1/0112 |
| 2018/0006945 | A1* | 1/2018 | Flajslik .................. H04L 47/30 |
| 2018/0101923 | A1* | 4/2018 | Griesmann ........... H04W 64/00 |
| 2018/0158324 | A1 | 6/2018 | Daniel et al. |
| 2018/0174445 | A1 | 6/2018 | Rolf |
| 2018/0295573 | A1* | 10/2018 | Gidvani ............ H04W 52/0229 |
| 2019/0220969 | A1 | 1/2019 | Yuman et al. |
| 2019/0059071 | A1 | 2/2019 | Alexey et al. |
| 2019/0089634 | A1 | 3/2019 | Xin et al. |
| 2019/0186929 | A1 | 6/2019 | Tominori et al. |
| 2019/0316919 | A1 | 10/2019 | Shailini et al. |
| 2020/0160695 | A1* | 5/2020 | Liu ........................ G08G 1/012 |
| 2020/0168084 | A1 | 5/2020 | Hao et al. |
| 2020/0273326 | A1* | 8/2020 | Shotton ................ G08G 1/0145 |
| 2021/0020034 | A1* | 1/2021 | Lorenz ................. G08G 1/0141 |

FOREIGN PATENT DOCUMENTS

| | | |
|---|---|---|
| KR | 101638368 | 7/2016 |
| WO | WO 2018/122585 A1 | 7/2018 |

OTHER PUBLICATIONS

U.S. Office Action for U.S. Appl. No. 16/247,608 dated Dec. 16, 2020.
U.S. Notice of Allowance for U.S. Appl. No. 16/247,608 dated Apr. 21, 2021.
European Search Report issued in European Application No. 207414738.4 dated Feb. 16, 2022 (four (4) pages).
European Office Action issued in European Application No. 207414738.4 dated Feb. 28, 2022 (11 pages).

* cited by examiner

SYSTEM AND METHOD FOR DETECTION AND QUANTIFICATION OF IRREGULAR TRAFFIC CONGESTION

CROSS-REFERENCE TO RELATED APPLICATIONS

The present application is a continuation of U.S. patent application Ser. No. 16/247,608, filed on Jan. 15, 2019 and entitled "SYSTEM AND METHOD FOR DETECTION AND QUANTIFICATION OF IRREGULAR TRAFFIC CONGESTION", which is incorporated by reference herein in its entirety.

FIELD OF THE INVENTION

The present invention relates generally to traffic control. More specifically, the present invention relates to detection and quantification of irregular traffic congestion.

BACKGROUND OF THE INVENTION

Automobile or road traffic congestion has become part of modern life and is increasingly being felt by an ever-growing portion of the population. State of the art methods for dealing with traffic congestion may include ground-based sensors (e.g., closed-circuit cameras) for detection of congestion conditions, and control centers in which such information may be acted upon.

Traffic congestion outliers are referred herein as conditions of congestion that may be irregular or unusual (e.g., in time or location). Such outliers may provide two types of information:
- on an immediate level, such information may indicate an occurrence of an unusual traffic condition (e.g., a malfunction or a car accident), and should be acted upon promptly (e.g., by a police patrol); and/or
- on a long-term level, the evolution of a traffic congestion outlier over time and location may indicate soft points in traffic planning.

However, state of the art methods and systems for monitoring of traffic congestion do not include an identification of traffic congestion outliers.

SUMMARY OF THE INVENTION

Embodiments of the present invention may include a system and a method of detecting and handling traffic congestion outliers by at least one processor. Embodiments of the method including: receiving, from a plurality of information sources, data corresponding to at least one temporal, local traffic property; producing a local, time-based traffic profile based on the received data; receiving, from at least one information source, new data corresponding to at least one temporal, local traffic property; analyzing the new data in relation to at least one respective time-based traffic profile, to produce a score of the new data; and if the score surpasses a threshold, then identifying the data as originating from a local, temporal traffic congestion outlier and producing at least one recommendation for handling the traffic congestion outlier.

Embodiments of the present invention may include segmenting a geographic region of interest (ROI) into a plurality of segments based on a granularity parameter.

Producing a local, time-based traffic profile may include arranging the received data in a plurality of historic baselines, where each historic baseline may be associated with a specific segment; and producing a time-based traffic profile per each segment based on the respective historic baseline.

Arranging the received data in a historic baseline may include: fragmenting time (e.g., time of day) to a plurality of discrete timestamp bins of a predefined duration; synchronizing the temporal traffic property data of the plurality of information sources according to the discrete timestamp bins; and aggregating data from the plurality of information sources into respective timestamp bins.

Producing a time-based traffic profile per each segment may include: computing one or more values of one or more statistical parameters of the one or more traffic properties; and aggregating the computed one or more values to produce a time-based profile. The time-based profile may represent a normal (e.g., usual, everyday) evolution (e.g., change over time) of the traffic property over time for a specific segment.

Producing a score of the new data may include: producing one or more severity rates; assigning a weight to each severity rate; and accumulating one or more severity rates according to the weights, to produce an overall accumulated weighted score.

Embodiments of the invention may include comparing the accumulated weighted score to a threshold (e.g., a threshold predefined by a user), to identify a road segment as having a condition of a congestion outlier.

Computing one or more values of one or more statistical parameters may include: producing a distribution histogram of the at least one traffic property, over the plurality of discrete timestamp bins per each segment; training a Gaussian Mixture Model (GMM) per each segment, based on the distribution histogram; and labeling each Gaussian distribution of the GMM to represent a probability of distribution of the at least one traffic property according to a timing property.

Producing one or more severity rates may include: predicting the value of the temporal, local traffic property according to at least one GMM; comparing the value of the traffic property of the new data with the predicted value of the traffic property; and producing a first severity rate of the temporal, local traffic property based on the comparison.

Producing one or more severity rates may include: producing a Gaussian distribution function of the at least one local, temporal traffic property per each segment and per each timestamp bin; calculating the difference between the new data value and the mean value of the Gaussian distribution function in z-score units; and producing a second severity rate based on the calculation.

Producing one or more severity rates may include: calculating a historical extremum value (e.g., a maximal value and/or a minimal value) of the at least one local, temporal traffic property per each segment and per each timestamp bin; comparing the new data value with the calculated historical extremum value; and producing a third severity rate based on the comparison.

According to some embodiments, the new data may be an indication of a driver behavior within a specific segment and timestamp bin. Producing one or more severity rates may include: counting occurrences of indications of driver behavior and producing a forth severity rate based on the count.

According to some embodiments, the new data may include textual traffic property data that may originate from at least one online textual data source. Producing one or more severity rates may include: analyzing the textual data to determine whether the data indicates a condition of a traffic congestion; cross referencing the analyzed data with geo-location data of the user; determining if the congestion may be a historical first-time occurrence of a congestion at the user's location; and if the congestion may be a historical first-time occurrence of a congestion at the user's location then producing a fifth severity rate.

According to some embodiments, the new data may include numerical traffic property data originating from one or more online numerical data sources. Producing one or more severity rates may include: extracting the numerical data; analyzing the numerical data to determine whether the numerical data indicates a condition of a traffic congestion at a specific location; identifying whether the determined congestion may be a first-time occurrence of a congestion at the respective location; and if the congestion may be a historical first-time occurrence of a congestion at the respective location then producing a sixth severity rate.

Embodiments of the present invention may include: clustering a plurality of segments that may be identified as having a condition of a traffic congestion outlier, to a plurality of clusters; assigning a cluster score to each cluster according to at least one severity rate of member congested segments; and producing a traffic report that may include one or more of a geographic representation of the plurality of clustered segments and the clusters' respective cluster score.

Embodiments of the present invention may include: clustering the plurality of spatial clusters to form a time-based cluster model of spatial clusters; and analyzing each such time-based cluster to determine an evolution of an outlier congestion condition over time. The congestion report may include the evolution of at least one time-based cluster and may facilitate identification of weak spots in traffic planning.

The plurality of information sources may include at least one physical roadway detector selected from a list that may include, for example, one or more of: an induction loop, a radar, an infrared camera, a still camera, a video camera, a Light Detection and Ranging (LIDAR) sensor, a pneumatic sensor, a piezoelectric sensor, a magnetic sensor, an acoustic sensor, a doppler microwave sensor and a Bluetooth receiver.

The plurality of information sources may include at least one in-vehicle sensor that may be selected from a list that may include, for example, one or more of: a geo-location sensor, a collision detector and a proximity detector.

The plurality of information sources may include a textual traffic report in a social network. Embodiments of the present invention may include extraction of data relating to traffic congestion from the textual traffic report.

The recommendation may include at least one data element that may correspond to a condition of a local, temporal traffic congestion outlier. The at least one data element may be selected from a list that may include, for example, one or more of: a geographical location corresponding to a spatial cluster, an origin of a time-based cluster and cluster score.

The recommendation may include a prompt for a user's attention to a condition of a congestion outlier. Embodiments of the present invention may include detecting a source of traffic irregularity or a congestion factor using one or more integrated CCTV cameras according to the prompt.

Embodiments of the present invention may include sending the recommendation via a cellular communication network to at least one of: a freeway service patrol and a police patrol. The recommendation may include an assignment of a task or task list to the patrol force, according to specific characteristics of the congestion outlier.

Embodiments of the present invention may include sending the recommendation to a dynamic message signage (DMS) system. The recommendation may include a warning and/or an instruction to the public.

Embodiments of the present invention may include training a neural network to predict at least one condition of at least one road segment given an identification of at least one traffic congestion outlier.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
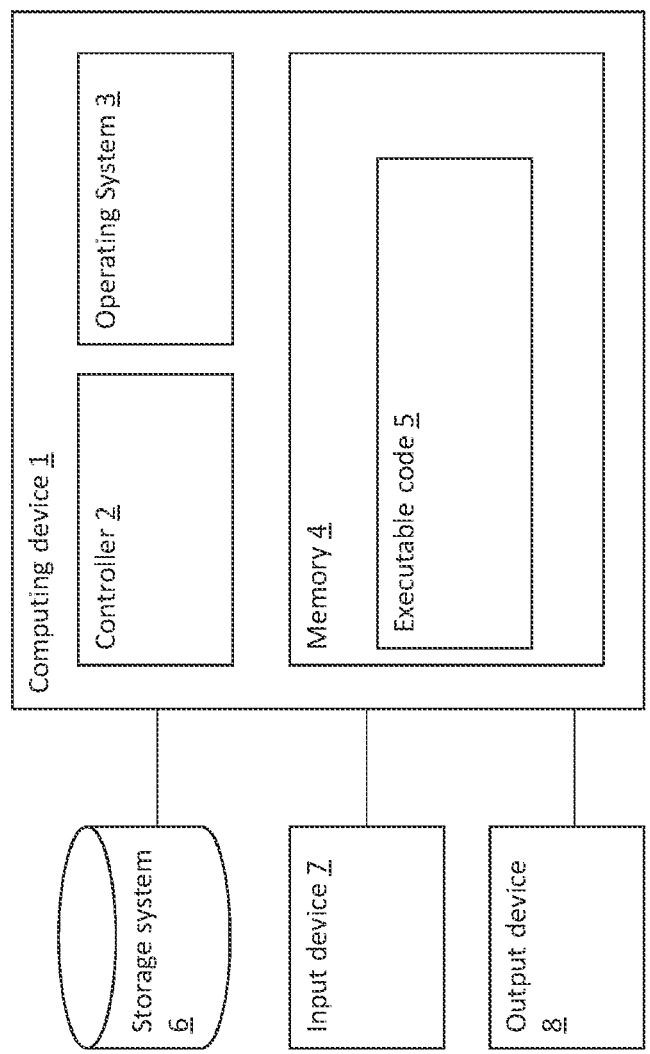
FIG. 1 is a block diagram, depicting a computing device, that may be included in a system for detection and quantification of irregular traffic congestion, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose a method and a system for detection and quantification of irregular motor vehicle or road traffic congestion.

Reference is now made to FIG. 1, which is a block diagram depicting a computing device, which may be included within an embodiment of a system for detection and quantification of irregular traffic congestion, according to some embodiments.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc., for example by executing code or instructions stored in a non-transitory storage medium. More than one computing device 1 may be included in, and one or more computing devices 100 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium. e.g., a RAM.

Figure 7:
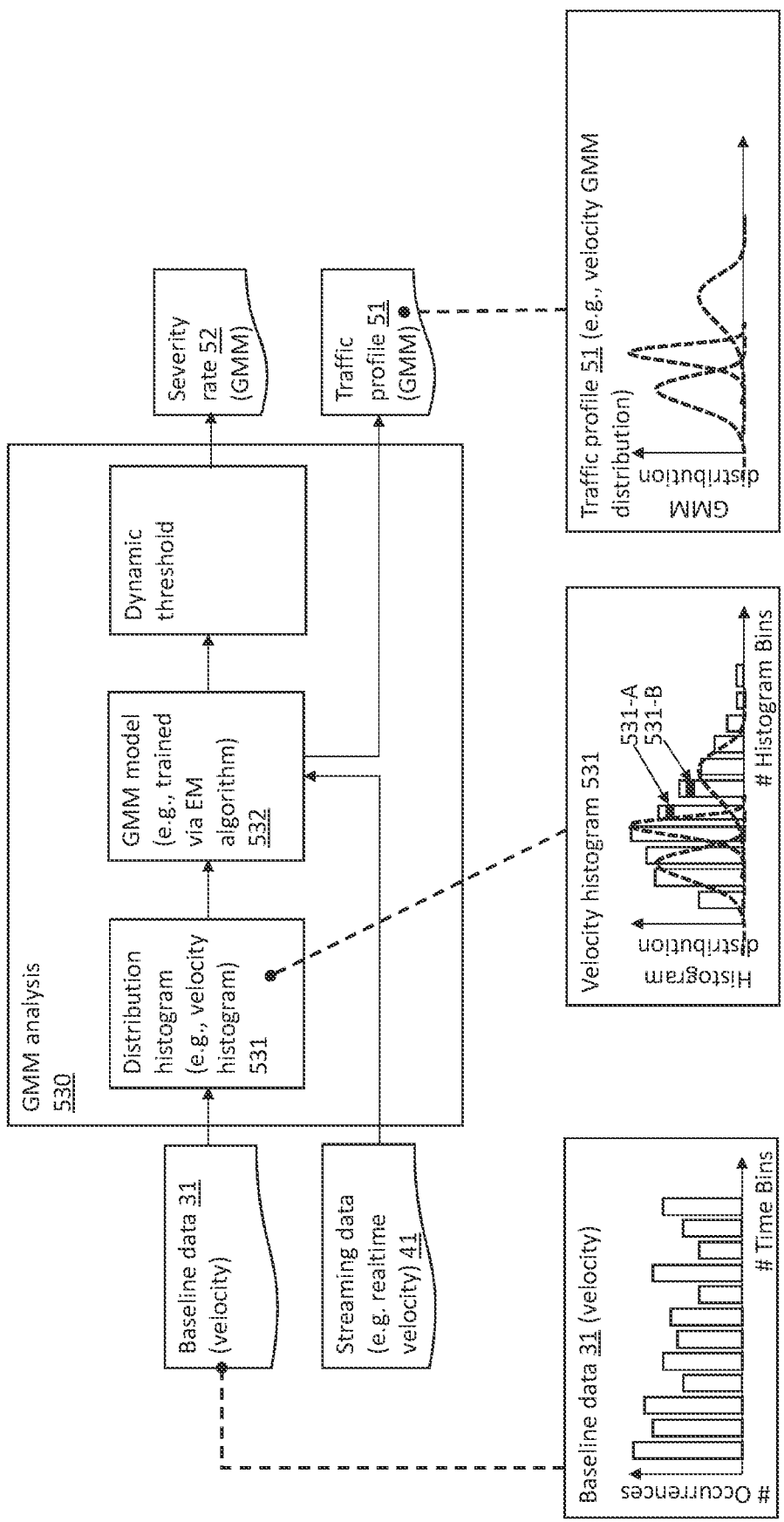
FIG. 7 is a block diagram, depicting a Gaussian Mixture Model (GMM) analysis module that may be included within a system for detection and quantification of irregular traffic congestion, according to some embodiments.

Executable code 5 may be any executable code, e.g., an application, a program, a process, task or script. Executable code 5 may be executed by controller 2 possibly under control of operating system 3. For example, executable code 5 may be an application that may detect and quantify irregular traffic congestion as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein. Different units and models (e.g. GMM 530. FIG. 7, post-processing module 80, etc.) may include or be included in components such as shown in FIG. 1.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory 120 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2:
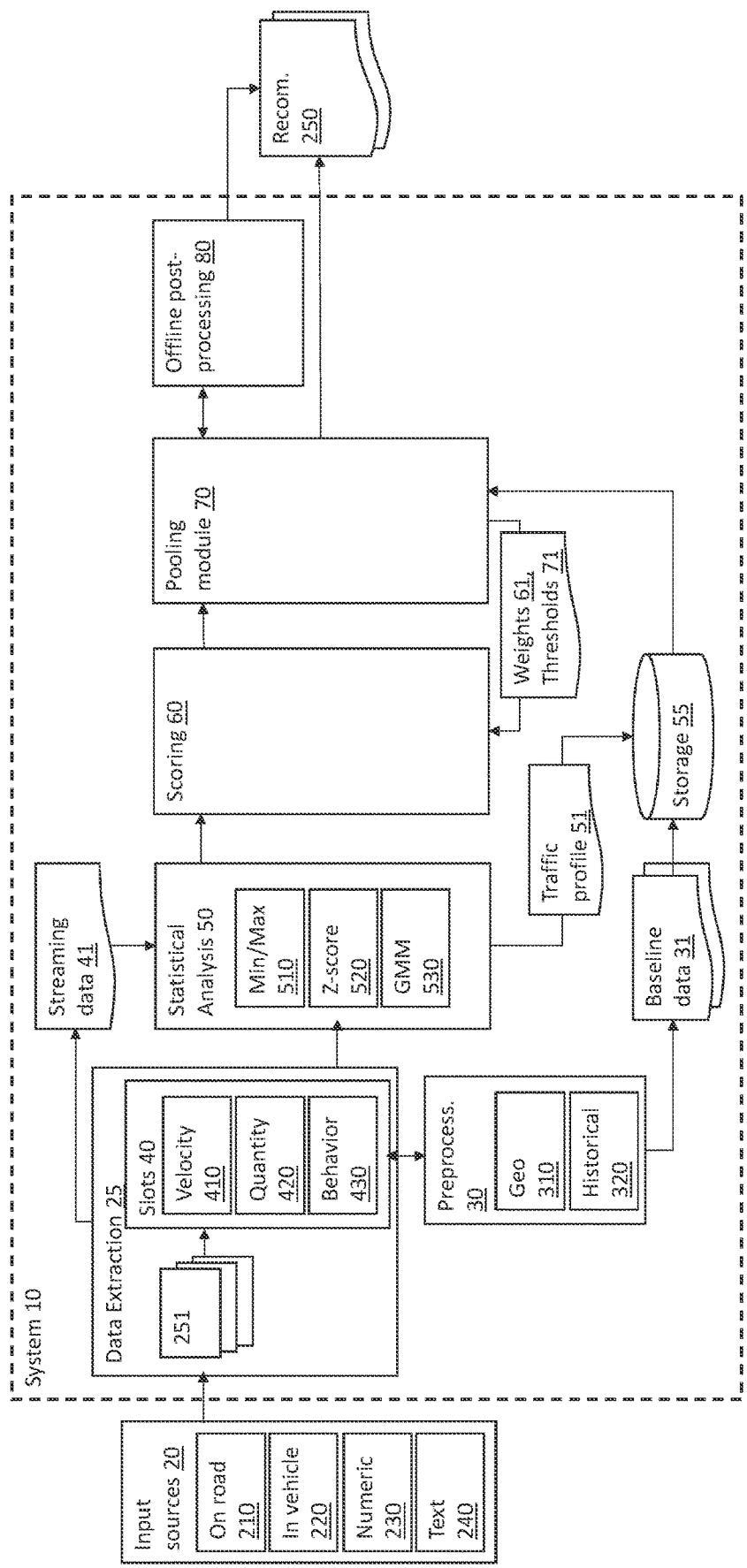
FIG. 2 is a block diagram, depicting a system for detection and quantification of irregular traffic congestion according to some embodiments.

Reference is now made to FIG. 2, which is a block diagram, depicting a system 10 for detecting traffic congestion outliers, according to some embodiments. System 10 may be configured to accumulate traffic-related information pertaining to a plurality of road segments over time, analyze the accumulated data to produce a characteristic profile of traffic properties in each segment, and detect and quantify traffic congestion outliers in real time or near-real time. System 10 may then act upon the detected congestion outliers or produce at least one recommendation for action to handle the detected congestion, as explained herein.

The term "traffic congestion outlier" may be used herein to describe a condition of irregularly congested traffic, that may be characterized by at least one abnormal, or non-ordinary traffic property that is beyond the characteristic profile of traffic properties in each segment. Such an outlier may indicate, for example, a particularly or unusually slow velocity at a specific road segment, a particularly or unusually large number of vehicles at that segment, a particularly or unusually high number of behavioral indicators pertaining to drivers in the specific segment, indicating a condition of traffic congestion, and the like.

System 10 may include or may be implemented by one or more computing devices (e.g., element 1 of FIG. 1), and may include at least one non-transitory computer-readable storage medium or memory device (e.g., element 4 of FIG. 1), wherein modules of instruction code are stored, and a processor (e.g., element 2 of FIG. 1) associated with memory device 4, and configured to execute the modules of instruction code. Processor 2 may be configured, upon execution of the modules of instruction code, to implement at least one method of detecting and/or quantifying traffic congestion outliers, as described herein.

System 10 may receive as input 20 data from a plurality of data sources, including for example: on-road 210 data sources, in-vehicle 220 data sources, online numeric 230 and online textual 240 data sources.

On-road 210 data sources may include for example:
  detectors configured to detect passage of a vehicle thereupon, such as: induction loops, pneumatic and piezo-electric detectors,
  detectors configured to detect passage of a vehicle in the vicinity, such as: magnetic, acoustic, and Bluetooth detectors;
  detectors configured to detect vehicles according to reception of reflected electromagnetic energy, such as: doppler microwave detectors. Light Detection and Ranging (LIDAR), and radars; and
  detectors configured to detect vehicles based on image analysis, where the images may be obtained from an Infra-Red (IR) or optical, still or video cameras.
In-vehicle 220 data sources may include for example:
  detectors of geographic location (e.g., a Global Positioning System (GPS) receiver, a cellular network receiver, etc.);
  detectors pertaining to the vehicle's condition (e.g., a speedometer, a compass etc.);
  detectors pertaining to the vehicle's behavior, from which the driver's behavior may be inferred (e.g., a detector of the vehicle's steering orientation, a detector of the vehicle's brake pedals and/or acceleration of the vehicle, and the like); and
  a collision and/or distance detector (e.g., a radar detector configured to identify proximity to other vehicles).

In some embodiments, at least one in-vehicle 220 data source may be communicatively connected (e.g., via a cellular network) to system 10, and may transmit the detected data (e.g., geographic location) to system 10 therethrough.

Online numeric data sources 230 may include, for example:
  data such as travel duration per specific road segments, from navigation applications (e.g., Google maps. Waze, etc.); and
  data such as travel duration per specific road segments, from a Transportation Management Center (TMC).
Online textual data sources 240 may include, for example textual messages (e.g.: "I am stuck in traffic") that may be included in correspondence over an online platform, such as an online messaging application (e.g., 'WhatsApp') or social network (e.g., 'Waze').

System 10 may include a data extraction module 25, configured to extract data pertaining to at last one traffic property from the input of the plurality of data sources 20. In some embodiments, data extraction module 25 may include a plurality of data extraction submodules 251, each adapted to extract the at last one traffic property from a respective input source 20. It is to be noted that the inclusion of each data extraction submodule 251 may depend on the specific embodiment or implementation of system 10, and the specific input data sources 20 available thereto.

For example, pertaining to on-road 210 data sources configured to detect passage of a vehicle thereupon or in the vicinity (e.g., a Bluetooth detector) as described above, at least one respective data extraction submodule 251 may be configured to extract data vehicle from at least one respective data source. The data may include, for example:
  a location of a vehicle (e.g., by determining existence of a vehicle in the vicinity of a detector);
  speed, (e.g., by measuring a time lapse of passage of a vehicle between two detectors); and
  quantity of vehicles within a predefined road segment (e.g., by counting the number of vehicles passing in the vicinity of at least one detector within a predefined period).

In another example, pertaining to on-road 210 data sources configured to detect vehicles according to reception of reflected electromagnetic energy (e.g., radar, LIDAR, etc.), at least one respective data extraction submodule 251 may be configured to identify a passing vehicle according to, for example, the reflected electromagnetic energy, and extract data regarding the location and speed of the identified vehicle.

In another example, pertaining to in-vehicle 220 data sources, at least one respective data extraction submodule 251 may be communicatively connected to the respective in-vehicle 220 data source, and may be configured to:
  receive data from the respective in-vehicle 220 data source, including for example: speed, direction, geographic location, orientation of the vehicle's steering; and
  extract data pertaining to at least one of: the vehicle's behavior (e.g., steering, lane handling, acceleration, braking, distance of the vehicle from other vehicles, etc.), the vehicle's geographic location, the vehicle's speed, etc.

In another example, pertaining to online numeric data sources 230 (e.g., an online navigation application, a TMC system, and the like), at least one respective data extraction submodule 251 may be communicatively connected (e.g., via a cellular data network) to at least one online numeric data sources 230, and may be adapted to extract numeric data relating to traffic within a specific road segment at specific timing. Such data may include, for example: duration of transport between two geographic locations or along a specific road segment, speed of one or more vehicles in the road segment, quantity of vehicles within the road segment and the like.

In another example, pertaining to online textual data sources 240 (e.g., textual data included in correspondence over an online platform, such as an online messaging application or a social network): at least one respective data extraction submodule 251 may be communicatively connected (e.g., via a cellular data network) to at least one online textual data source 240, and may be configured to apply at least one text analysis algorithm, as known in the art (e.g., a normal language processing (NLP) based algorithm), to extract contextual data relating to traffic in at least one road segment. For example, a user may send (e.g., through a mobile device) a text message that may include a phrase such as: "I am stuck in traffic and will be late to work". At least one data extraction submodule 251 may identify this type of information and cross reference it or associate it with a geo-location of the user (e.g., via location of a cellular base station and/or GPS-based location). The extracted data may serve as an indication of a congestion in traffic, as explained herein.

According to some embodiments, data extraction module 25 may include a slot-sorting module 40, configured to associate at least one extracted data element from a data extraction submodule 251 with a respective category or slot, where each slot may represent a respective traffic property, including for example a velocity property 410 (e.g., velocity of one or more vehicles at a respective road segment), a quantity property 420 (e.g., the number of vehicles at a respective at a respective road segment), and a behavioral property 430 (e.g., the number of times that drivers have switched lane or pressed the brake pedal).

For example, data extraction submodules 251 may extract different data elements relating to velocity from a plurality of input sources 20 (e.g., from on-road detectors 210 such as radars and in-vehicle detectors 220 such as a speedometer, as elaborated above). Slot-sorting module 40 may associate the different data elements to velocity slot 410, so as to categorize these data elements as relating to vehicle speed and analyze them together as explained herein.

As shown in FIG. 2, system 10 may include a preprocessing module 30, including a geographical preprocessing module 310 and a historical preprocessing module 320 configured to perform initial preprocessing of geographical and temporal data, respectively.

Geographical preprocessing module 310 may be configured to receive (e.g., from a TMC system) geographical motorway data relating to at least one geographic Region of Interest (RoI) (e.g., roads within a sector of a city). The geographical motorway data may include for example a representation of roads and junctions as a linked graph, where arcs or edges may represent real-world roads and nodes may represent real-world junction. In some embodiments, one or more edge may be attributed at least one road property, including for example length (e.g. in meters), a permitted speed, a number of lanes, directionality (e.g., one-way or two-way traffic), etc.

Geographical preprocessing module 310 may further receive (e.g., from a user) one or more parameters, including for example: a granularity parameter and a system requirement parameter, and may segment the geographic RoI to a plurality of road segments according to the received one or more parameters.

For example, a user may assign a high value to the granularity parameter in an urban RoI, that may be characterized by busy traffic, thus requiring module 310 to segment the RoI to smaller (e.g., 'grainier') segments. Such granularity may enable system 10 high-resolution determination of traffic congestion in the urban RoI, as explained herein. In a complementary manner, a user may assign a low value to the granularity parameter in a rural RoI, to require module 310 to segment the RoI to larger segments. Such low granularity settings may be set to reserve system resources (e.g., computational and storage resources).

Historical preprocessing module 320 may receive (e.g., via data extraction module 25) data corresponding to at least one temporal, local (e.g., relating to a specific road segment) traffic property from a plurality of information sources.

For example, module 320 may receive data pertaining to speed of at least one vehicle within a specific road segment from a plurality of data sources, including for example at least one on-road detector (e.g. a loop detector and/or a radar detector) and at least one in-vehicle detector (e.g., a speedometer).

Module 320 may arrange or divide the received data into a plurality of historic baselines 31, each associated with a specific segment, as elaborated herein and store the baseline in a storage module 55 (e.g., a database). The term baseline may be used herein to refer to a data structure that may include time-wise ordinate data pertaining to at least one element of traffic.

Figure 3:
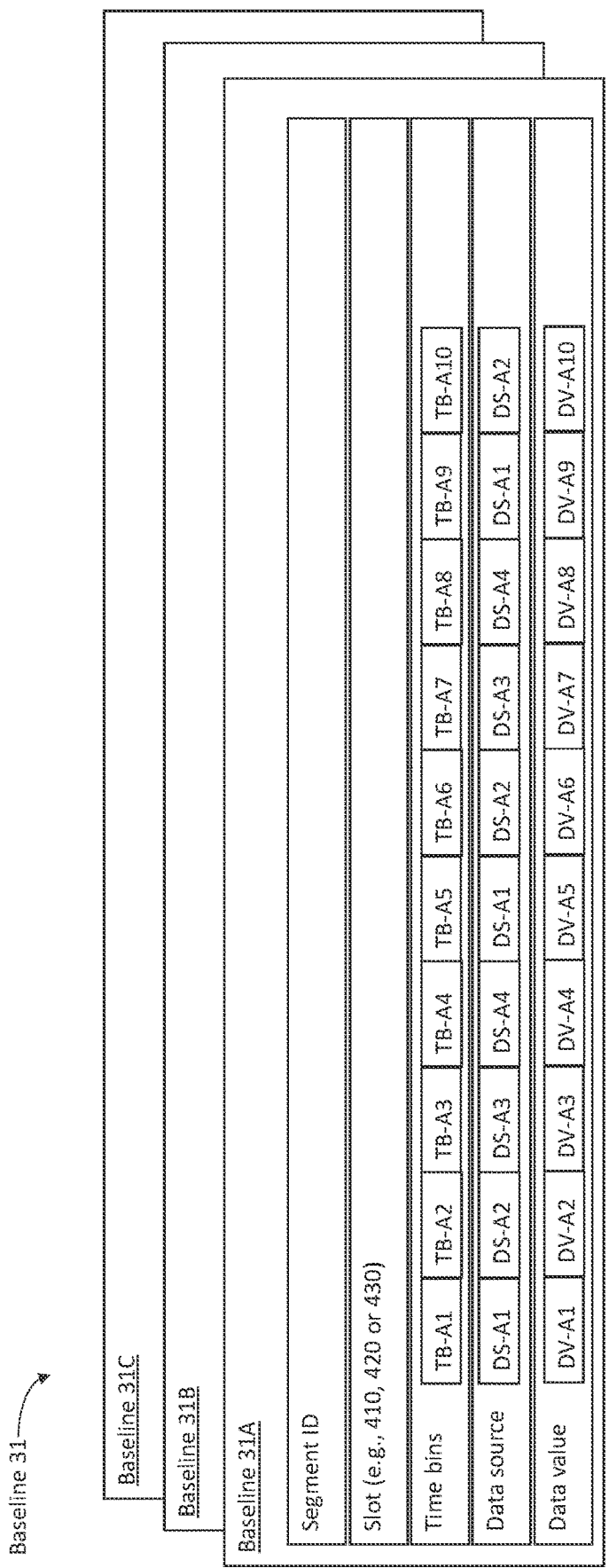
FIG. 3 is a block diagram, depicting an example of one or more baselines, that may be included within a system for detection and quantification of irregular traffic congestion, according to some embodiments.

Reference is now made to FIG. 3, which is a block diagram, depicting an example of one or more baselines, that may be included within a system for detection and quantification of irregular traffic congestion, according to some embodiments.

The one or more baselines may include or may be implemented as one or more tables (e.g., 31A. 31B. 31C). Each table may relate to a specific road segment (e.g., enumerated by a segment identification number (ID)) and a data category or slot (e.g., velocity 410, quantity 420, behavior 430). In some embodiments each table may include a plurality of timestamp bins TB (e.g. TB-A1 through TB-A10), each associated with at least one of: an indicator of a data source (e.g., an ID of an on-road detector, an indication of an in-vehicle detector, etc.), and a value of a traffic property extracted from a specific data source 20 (e.g., a value of speed relating to a specific road segment, extracted by a data extraction module 251 from a TMC database).

Referring back to FIG. 2, system 10 may include at least one statistical analysis module 50, configured to extract or compute a value of one or more statistical characteristic or parameters pertaining to one or more traffic property of baseline data 31 (e.g., related to velocity slot 410, quantity slot 420 or behavior slot 430), associated with a specific road segment as explained herein. For example, at least one statistical analysis module 50 may be configured to compute the mean value of vehicle velocity in a specific road segment by computing the mean of data value entries (e.g., DV-A1 through DV-A10) associated with a velocity slot (e.g., 410) on a baseline of the respective segment.

In some embodiments, at least one statistical analysis module 50 may assign a weight to each data value entry (e.g., DV-A1 through DV-A10) and compute the value of the one or more statistical characteristic or parameters according to the assigned weight. For example, a user may dictate (e.g. via input element 7 of FIG. 1) that a first data source (e.g., DS-A1, that may be an on-road radar detector 210) is more reliable than a second data source (e.g., DS-A2, that may be an online textual data source 240). Statistical analysis module 50 may consequently assign a first weight to the first data source and a second (e.g. smaller) weight to the second data source and compute the statistical parameter (e.g. mean velocity) according to the weights.

The at least one statistical analysis module 50 may aggregate the one or more computed values of statistical parameters per each road segment, to produce a time-based traffic profile 51 per each segment based on the respective historic baseline.

The term traffic profile may be used herein to refer to a data structure (e.g., a table, a list and the like), that may represent a normal (e.g., a usual or everyday) evolution (e.g. change over time) of at least one traffic property (e.g., speed, quantity of vehicles, behavior of drivers, etc.) over time per a specific road segment.

Figure 4:
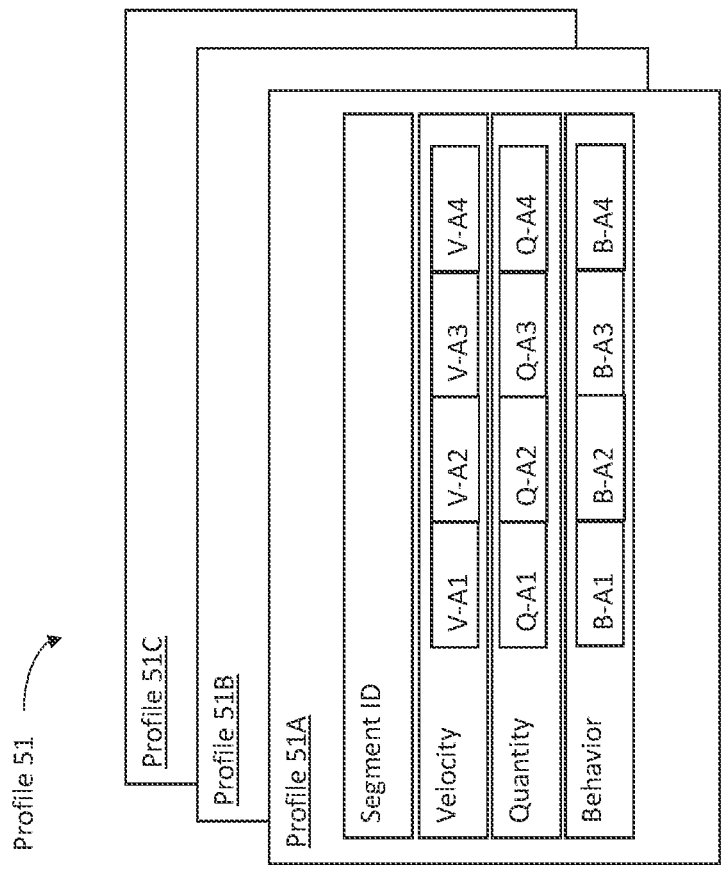
FIG. 4 is a block diagram, depicting an example of one or more traffic profiles, that may be included within a system for detection and quantification of irregular traffic congestion, according to some embodiments.

Reference is now made to FIG. 4, which is a block diagram, depicting an example of one or more traffic profiles, that may be included within a system for detection and quantification of irregular traffic congestion, according to some embodiments.

The one or more traffic profiles may include or may be implemented as one or more tables (e.g., 51A, 51B and 51C), that may be stored on a storage device (e.g., element 55 of FIG. 2). Each table may relate to a specific road segment (e.g., enumerated by a segment ID), and may include values of historic statistical properties or parameters pertaining to that road segment.

According to some embodiments, the historic statistical properties may relate to at least one category or slot, including for example the velocity and quantity of vehicles within a specific segment ID and the behavior of drivers within that segment.

Velocity-related statistical properties ('V') relating to road segment ID (e.g., V-A1 through V-A4) may include, for example:
historical mean and standard deviation values (e.g., Z-score parameters) of vehicle speed, as explained herein;
historical minimum and maximum values of vehicle speed; and
Gaussian Mixture Model (GMM) parameters relating to vehicle speed, as explained herein.

Quantity-related statistical properties ('Q') relating to road segment ID (e.g., Q-A1 through Q-A4) may include, for example:
historical mean and standard deviation values (e.g., Z-score parameters) of the quantity of vehicles, as explained herein; and
historical maximum values of the number of vehicles.

Behavior-related statistical properties ('B') relating to road segment ID (e.g., B-A1 through B-A4) may include, for example, historical extremum (e.g., maximum, minimum), mean, and standard deviation values (e.g., Z-score parameters) for the amount of actions and/or the intensity of actions (e.g., maximal intensity of deceleration) that may be performed by drivers within road segment ID. The driver actions may include, for example: acceleration, deceleration, lane handling, braking, turning, etc.

According to some embodiments, system 10 may include a scoring module 60, configured to receive, from the plurality of information sources, new data (e.g., data obtained after the time-based traffic profile 51 has been produced) corresponding to at least one temporal, local traffic property, and analyze (e.g., compare) the new data in relation to at least one time-based traffic profile 51, to produce a weighted score or rating of the new data.

The terms "significantly lower" and "significantly higher" are used herein to indicate a condition where the difference derived from the comparison of the new data (e.g., data obtained after the time-based traffic profile 51 has been produced) with at least one statistic parameter of the time-based traffic profile 51 surpasses a predefined threshold, as explained herein.

For example, if a first data source (e.g., an on-road 210 data source, such as a LIDAR detector) associated with a specific road segment indicates that the number vehicles is significantly below a historical mean number for that time of day at that road segment, scoring module 60 may attribute a first, low score to a quantity slot associated with that road segment, indicating a low probability for traffic congestion.

In another example, if a second data source (e.g., an in-vehicle 220 data source, such as a detector of the engine's cycles) indicates that a plurality of vehicles are using low gear (e.g., high engine RPM in relation to the vehicle's speed), significantly below the mean value for that time of day at that road segment, scoring module 60 may attribute a second, high score to a velocity slot associated with that road segment, indicating a high probability for traffic congestion.

In yet another example, if a third data source (e.g., an online numeric data source 230 such as an online navigation application) indicates that the average velocity of vehicles is below the absolute minimum speed for that time of day at that road segment, scoring module 60 may attribute a third high score to a velocity slot associated with that road segment, indicating a high probability for traffic congestion.

Scoring module 60 may apply weights 61 to each type of comparison. For example, a Scoring module 60 may assign high weight values 61 to scores that may be regarded as reliable (e.g., originating from a plurality of sources), to produce a high weighted score 62. In another example, scoring module 60 may assign low weight values to scores that may be regarded as indecisive or inaccurate (e.g., a plurality of scores that may be incoherent or dissimilar) to produce a low weighted score 62. Scoring module 60 may aggregate or accumulate the weighted scores 62 and compare the accumulated score with a predefined threshold, to produce an overall weighted score. If the overall weighted score surpasses the predefined threshold, then system 10 may identify or categorize the new data (e.g., data obtained after the time-based traffic profile 51 has been produced) as originating from a road segment having a traffic congestion outlier. If the overall weighted score does not surpass the predefined threshold, then system 10 may not identify or categorize the new data as originating from a road segment having a traffic congestion outlier.

System 10 may include a pooling module 70, configured to analyze the weighted scores 62, to determine whether an identified congestion is a congestion outlier. The term congestion outlier may be used herein to refer to a congestion that substantially exceeds (by a predetermined factor) normal historical congestion conditions for a specific road segment at a specific time (e.g., time of day, day of week, date of year, etc.). The functionality of scoring module 60 and pooling module 70 are further elaborated below, in relation to FIG. 8.

Following determination of a congestion condition as a congestion outlier, system 10 may produce at least one recommendation 250 for handling the traffic congestion outlier, as explained herein.

Figure 9:
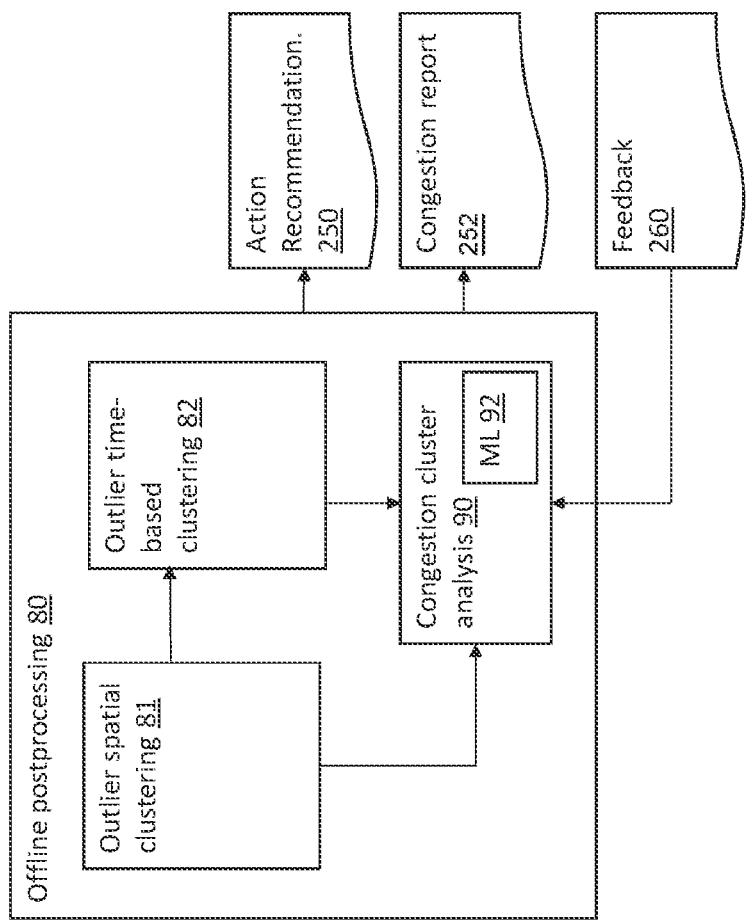
FIG. 9 is a block diagram, depicting an offline post processing module that may be included in a system for detecting and quantifying irregular traffic congestion, according to some embodiments.

According to some embodiments, system 10 may include an offline postprocessing module 80, configured analyze identified congestion outliers over time, and produce at least one additional recommendation 250 for handling the traffic congestion outlier, including as explained herein, in relation to FIG. 9.

Figure 5:
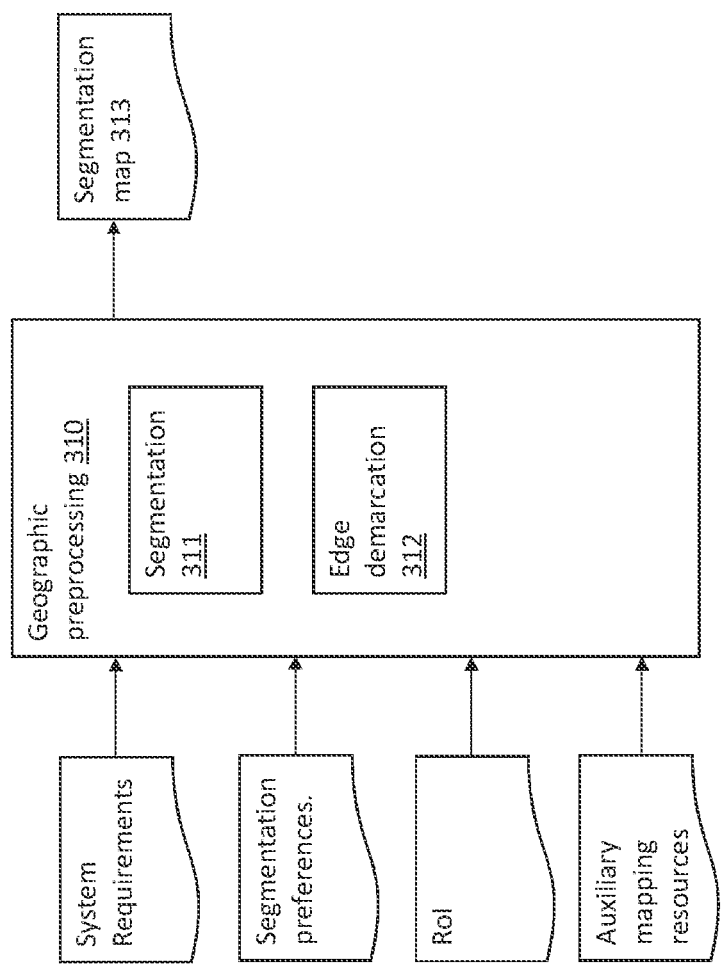
FIG. 5 is a block diagram, depicting a geographic preprocessing module that may be included within a system for detection and quantification of irregular traffic congestion, according to some embodiments.

Reference is now made to FIG. 5, which is a block diagram, depicting a geographic preprocessing module that may be included within a system for detection and quantification of irregular traffic congestion, according to some embodiments.

As shown in FIG. 5, geographical pre-processing model 310 may receive (e.g., from input module 7 of FIG. 1) at least one item of input data, including for example:
- data relating to system requirements (e.g., computational resources of system 10);
- data relating to a geographical region of Interest (e.g., a city, a district, a country, etc.);
- data relating to geographical information from at least one external auxiliary mapping resource, including for example a map of roads and junctions in the region of interest; and
- at least one segmentation preference parameter.

Geographic pre-processing model 310 may be configured to segment or divide the map of roads and junctions in the region of interest according to the system requirements and the at least one segmentation preference to produce a map of road segments 313.

For example, at least one first segmentation preference or parameter may be an urban granularity parameter, dictating for example the length (e.g. in meters) of each road segment in an urban environment, and a second segmentation parameter may be a rural granularity parameter, dictating for example the length (e.g. in meters) of each road segment in a rural environment. Granularity parameters may according to different modes or parameters.

Segmentation module 311 may segment or fragment roads of the provided map according to the granularity parameters to produce a map of road segments (hereinafter a "segmentation map"), including a plurality of nodes, interconnected by road segments. Edge demarcation module 312 may assign each road segment of the segmentation map an identification number (hereinafter "segment ID") for further reference to that segment.

Segmentation map 313 be implemented as any appropriate data structure including for example a linked list of nodes, where each node represents a geographical location, and each edge represents a road segment. Segmentation module 311 may include in or associate with each edge additional information relating to the respective road segment, this information may include, for example, a permitted speed, a number of lanes, a length of the segment and the like.

According to some embodiments, segmentation map 313 may be stored (e.g. in storage module 55), and may be updated according to changing needs, including for example a change in a respective real-world road, a change in the region of interest, and a change in the required granularity (e.g. when closer inspection of a specific area is required).

Figure 6:
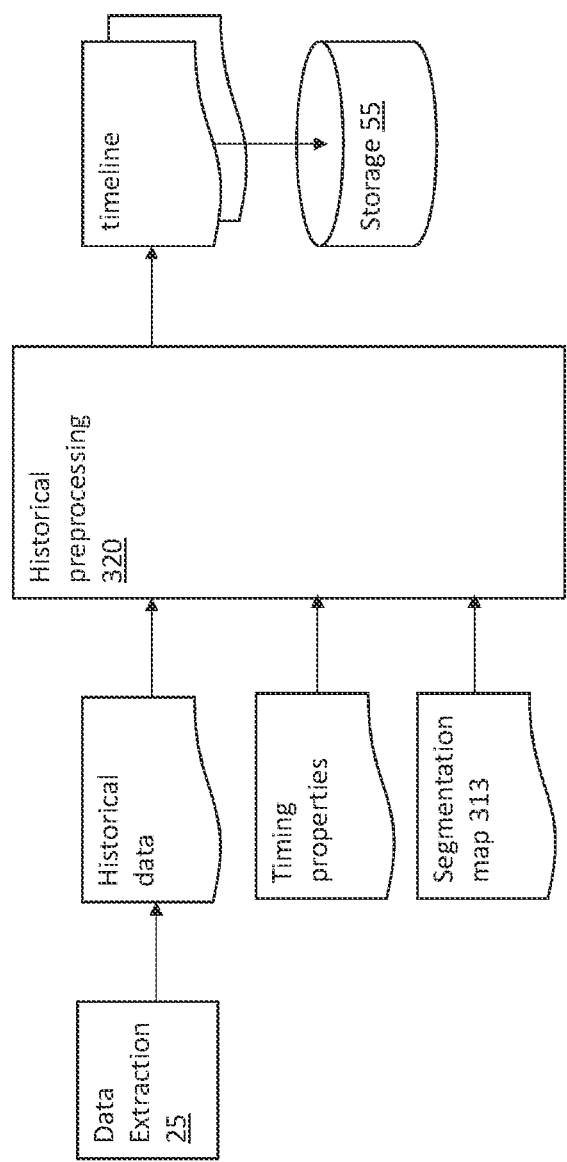
FIG. 6 is a block diagram, depicting a historical preprocessing module that may be included within a system for detection and quantification of irregular traffic congestion, according to some embodiments.

Reference is now made to FIG. 6, which is a block diagram, depicting a historical preprocessing module 320 that may be included within a system for detection and quantification of irregular traffic congestion, according to some embodiments.

As shown in FIG. 6, historical pre-processing module 320 may receive a plurality of historical data elements pertaining to at least one traffic property from data extraction module 25. For example, historical pre-processing module 320 may receive time-stamped information pertaining to velocity of at least one vehicle within a specific road segment.

Historical reprocessing module 320 may receive (e.g. from input module 7 of FIG. 1) a plurality of timing properties, including for example the time of day, day of the week, date of the year, and occurrence of an event such as a holiday, a known closure of a road segment, and the like.

Historical pre-processing module 320 may produce, per each road segment, a chronologic, historic baseline, including a plurality of timestamp bins, where each timestamp bin is of a predefined duration (e.g., 10 minutes). For example, historical pre-processing module 320 may equally fragment or divide time into a plurality of discrete timestamp bins or categories of a duration determined by a user (e.g., via input element 7 of FIG. 1).

Historical pre-processing module 320 may synchronize the historical, temporal traffic property data of the plurality of information sources according to discrete timestamp bins, and associate or aggregate each historical data element from the plurality of information sources and respective timing properties with a respective timestamp bin.

For example, historical pre-processing module 320 may receive:
- a first time-stamped data element (e.g. the number of vehicles within a segment), associated with at least one first timing property (e.g., Tuesday, 21:04, New-year's eve) and pertaining to a specific segment (e.g., segment ID #1); and
- a second time-stamped data element (e.g. velocity of a car) pertaining to the same segment (e.g., segment ID #1) and associated with at least one second timing property (e.g., Tuesday, 21:08, New-year's eve).

Historical preprocessing module 320 may assign or link the two data elements (number of cars and speed of single car) with the respective timestamp bin (e.g. 21:00-21:10) of that segment (e.g., segment ID #1). In other words, historical preprocessing module 320 may synchronize the two data elements according to the extent of the timestamp bins.

The plurality of chronologic baselines for each road segment may be stored on storage device 55 and may be further analyzed, as explained herein, to obtain statistic information pertaining to each road segment.

Reference is now made to FIG. 7, which is a block diagram, depicting a Gaussian Mixture Model (GMM) analysis module 530 that may be included within a system for detection and quantification of irregular traffic congestion, according to some embodiments. GMM analysis module 530 may be included in at least one statistical analysis module 50, as one of a plurality of statistical or modules adapted to compute a value of one or more statistical parameters determine a condition of traffic at one or more road segments.

As shown in FIG. 7, GMM module 530 may receive (e.g. from preprocessing module 30) at least one historical baseline 31 data object pertaining to a specific slot. For example, GMM module 530 may receive a baseline including time-based information pertaining to traffic velocity in a specific road segment. As shown in the example included in FIG. 7, baseline data 31 may include an association of a plurality of timestamp bins with respective quantities of the respective traffic property (e.g., velocity in KPH per each timestamp bin).

GMM module 530 may be adapted to produce a distribution histogram 531 of at least one traffic property (e.g. traffic velocity) from the data value entries (e.g. elements DV-A1 through DV-A1 of FIG. 3). As known in the art and shown in the example included in FIG. 7, histogram 531 may represent a distribution of occurrence of each value of the traffic property over time. For example, histogram 531 may include a plurality of histogram bins, each representing a number of occurrences of a traffic property (e.g., speed) within a specific range (e.g. between 30 and 40 Kilometers Per Hour (KPH)).

GMM module 530 may label each increment (e.g., 531-A, 531-B) of each histogram bin by a respective timing property. For example, if the velocity at a specific segment on a regular (e.g., non-holiday) Tuesday at 16:35 PM (e.g., between 16:00 and 17:00) was 35 KPH (e.g. between 30 and 40 KPH), then the respective increment (e.g., 531-A, 531-B) of the 30-40 KPH histogram bin may be labeled (e.g., by any type of numerical or character coding) as "Tuesday 16:00-17:00".

The labeling of each histogram segment by a respective timing property (e.g., during a training process) may be utilized to associate new streaming data of the traffic property with a respective Gaussian distribution of the GMM. In some embodiments. GMM analysis module 530 may label each Gaussian distribution of GMM model 532 to represent a probability of distribution of the at least one traffic property according to one or more timing properties. Pertaining to the same example, a first Gaussian distribution, centered at the 30-40 KPH histogram bin may include a small percentage (e.g., 30%) of the "Tuesday 16:00-17:00" label, and a second Gaussian distribution centered at the 40-50 KPH histogram bin may include a large percentage (e.g., 70%) of the "Tuesday 16:00-17:00" label. GMM analysis module 530 may therefore predict by a probability of 70% that a new streaming velocity data pertaining to that same timing property and geographical segment would be in the range of 40-50 KPH.

According to some embodiments. GMM analysis module 530 may be configured to produce and train a GMM model 532 for each road segment, according to the distribution histogram of the at least one traffic property, to represent the distribution of histogram bin values by a mixture of Gaussian distributions (e.g. traffic profile 51 (e.g., velocity GMM) element in FIG. 7). GMM analysis module 530 may train GMM model 532 according to any appropriate algorithm, including for example an Expectation-Maximization (EM) algorithm that employs an iterative process for training the GMM as known in the art.

As known in the art, and as shown in an example included in FIG. 7, the distribution of histogram bins may be presented as one or more (e.g., three, in the example of FIG. 7) weighted Normal or Gaussian distribution graphs. At least one parameter of the Gaussian distribution mixture model (e.g., number of Gaussian distributions, each Gaussian distribution's mean, each Gaussian distribution's weight, each Gaussian distribution's standard deviation, etc.) may be included within the traffic profile 51 of the respective segment, and may be stored by system 10, as depicted in FIG. 2 for further analysis.

According to some embodiments. GMM analysis module 530 may receive (e.g., from data extraction module 25) streaming data 41 associated with at least one temporal, local traffic property (e.g., a traffic property relating to a specific road segment). For example, streaming data 41 may include velocity of traffic at a specific time in the same segment.

GMM analysis module 530 may match the value of the temporal, local traffic property of streaming data 41 (e.g., velocity of traffic) with at least one GMM, and produce a severity rate 64 according to the matching of the data. In some embodiments, GMM analysis module 530 may predict the value of the temporal (e.g., relating to a specific timestamp bin), local (e.g., relating to a specific road segment) traffic property according to at least one GMM; compare the value of the traffic property of the new data with the predicted value of the traffic property; and produce a GMM severity rate 64 of the temporal, local traffic property according to the comparison.

Pertaining to the above example, assuming the streaming data 41 includes velocity data of the same geographical segment, at a Tuesday afternoon (e.g., 16:22 PM), GMM analysis module 530 may predict that the velocity should be 40-50 KPH at a probability of 70% and 30-40 KPH at a probability of 30%. If the newly received streaming data shows that the average velocity was 5 KPH, GMM analysis module 530 may produce a severity rate 64 that is a function (e.g., a linear weighted severity rate) of the difference from the predicted value. For example, in this case the severity rate 64 may be (0.7(45−5)+0.3(35−5))=37.

Figure 8:
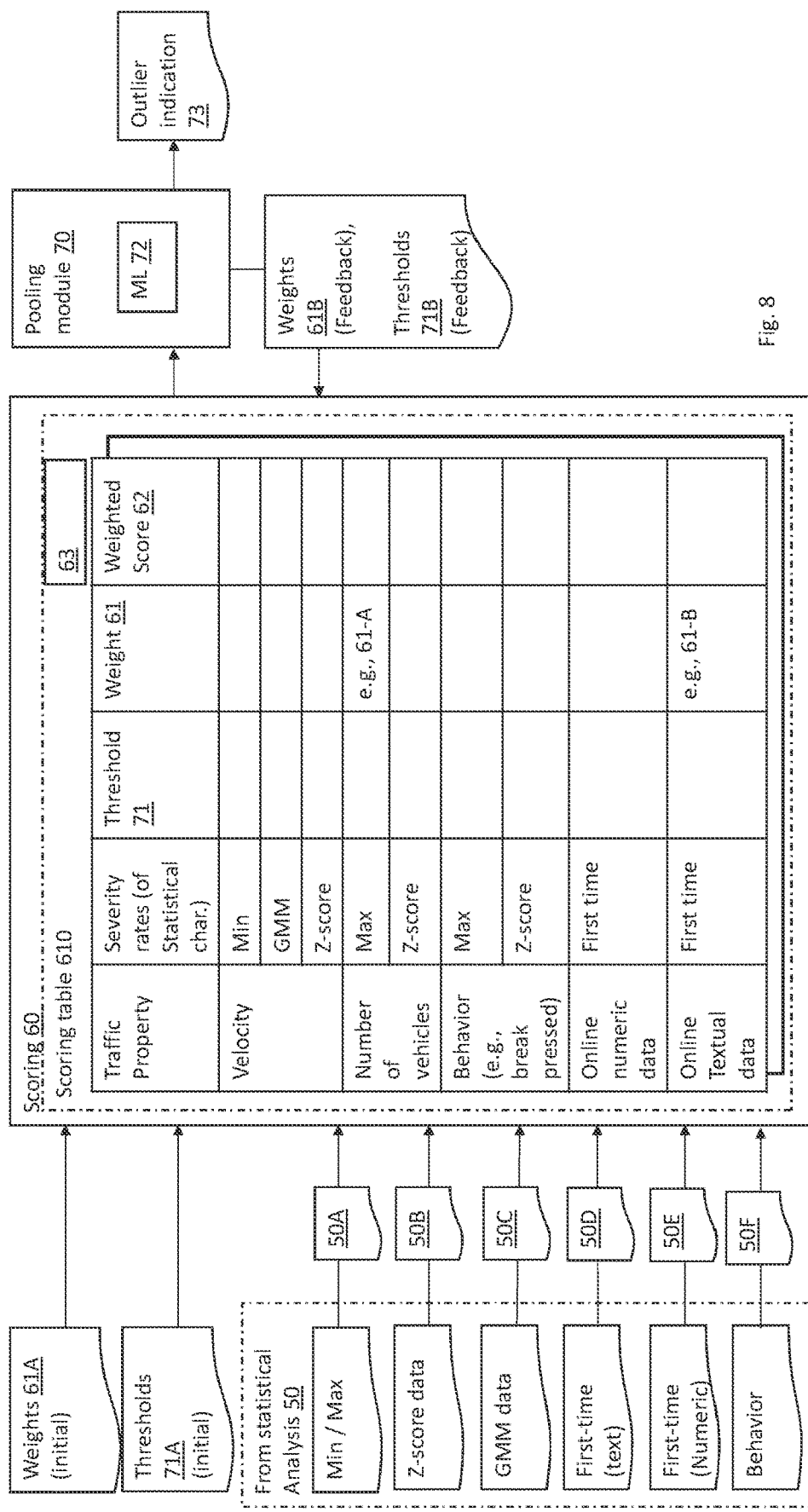
FIG. 8 is a block diagram, depicting a scoring module and pooling module, that may be included in a system for detecting and quantifying irregular traffic congestion, according to some embodiments.

Reference is now made to FIG. 8, which is a block diagram depicting a scoring module 60 and pooling module 70, that may be included in a system for detecting and quantifying irregular traffic congestion, according to some embodiments.

Scoring module 60 may receive (e.g., from statistical analysis module 50) at least one severity rate 64 associated with a statistical characteristic of a specific time-based (e.g., associated with a specific timestamp bin), spatial (e.g., associated with a specific road segment) traffic property (e.g., traffic velocity, number of vehicles in the segment, behavior of drivers in that segment, etc.).

For example, as explained above, GMM module 530 may receive real-time velocity at a specific road segment as streaming data (e.g., element 41 of FIG. 7), and match the real-time data with one of a plurality of Gaussian distributions in a GMM model (e.g., element 532 of FIG. 7). GMM analysis module 530 may calculate the absolute difference (e.g., in velocity units such as KPH) between the real time velocity of the streaming data 41 and the mean velocity of the matched GMM Gaussian distribution. GMM analysis module 530 may propagate the calculated absolute difference as a GMM-related severity rate 64 (e.g., 64C) to scoring module 60 for further analysis.

In another example, as explained elsewhere, Min/Max module 510 may receive real-time data relating to a specific traffic property at a specific road segment as streaming data (e.g., element 41 of FIG. 2). Min/Max module 510 may calculate a historical extremum value (e.g., historical minimum and/or maximum value) of the at least one local (e.g., relating to a specific road segment), temporal (e.g., relating to a specific timestamp bin) traffic property per each segment and per each timestamp bin. Min/Max module 510 may comparing new data value with the calculated historical extremum value and indicate whether the real-time data pertains to an historical minimum or maximum value. In some embodiments, an extremum value (e.g., maximal number of vehicles in a segment, minimal velocity of vehicles in the segment, maximal number of lane-handling behaviors by drivers in the segment) may be associated with a condition of traffic congestion.

For example, the real-time data may be a number of vehicles currently occupying a road segment or traffic velocity through the segment. Min/Max module 510 may produce an indication whether the number of vehicles is at a historical maximum and/or whether the speed is at a historical minimum (e.g., a condition that may be associated with traffic congestion). Min/Max module 510 may propagate the indication as a Min/Max-related severity rate 64 (e.g., 64A) to scoring module 60 for further analysis.

In another example, statistical analysis module 50 may receive (e.g., from data extraction module 25) time-based (e.g., associated with a specific timestamp bin), spatial (e.g., associated with a specific road segment) data comprising an indication of a driver behavior within a specific segment and timestamp bin. The indication may correspond to at least one behavior of one or more drivers within the road segment. For example, the data may include the number of times the drivers have pressed the car brake pedals, pressed the accelerator, shifted gears, crossed between lanes, etc. Statistical analysis module 50 may count these occurrences of indications of driver behavior and propagate the counted number as a behavior-related severity rate 64 (e.g., 64F) to scoring module 60 for further analysis.

In another example, as explained herein. Z-score module 520 may receive data pertaining to at least one time-based (e.g., temporal) spatial (e.g., local, pertaining to a geographical segment) traffic property and produce a Gaussian distribution function of the received data. For example, Z-score module 520 may receive data pertaining to traffic speed at a specific road segment and a specific timestamp bin (e.g., between 8:00 AM and 8:10 AM on non-holiday Monday mornings) and produce a Gaussian distribution function describing the distribution of traffic speed at that specific road segment and timestamp bin. Z-score module 520 may receive new streaming data (e.g., element 41 of FIG. 2), pertaining to the same traffic property, road segment and timestamp bin (e.g., velocity at the same street at 8:03 AM of a non-holiday Monday morning). Z-score module 520 may compare the new data with the mean of the Gaussian distribution function, and calculate the difference between the value of the streaming data (e.g., real-time velocity) and the mean value of the distribution function according to the Gaussian distribution function's standard deviation, so as to express the difference in units of standard deviation, also referred to as z-score units as known in the art.

Z-score module 520 may propagate a Z-score-related severity rate 64 to scoring module 60 based on the calculation the normalize difference value (e.g., in z-score units). For example, Z-score module 520 may propagate the calculated z-score values as a Z-score-related severity rate 64 (e.g., 64B) to scoring module 60 for further analysis.

In another example, statistical analysis module 50 may receive (e.g., from data extraction module 25) time-based (e.g., associated with a specific timestamp bin), spatial (e.g., associated with a specific road segment) textual traffic property data originating from at least one online textual data source 240. The traffic property data may include, for example textual messages (e.g.: "Heavy traffic on main street") that may be included in correspondence over an online, cellular or wireless platform, such as an online messaging application (e.g., 'WhatsApp') or social network (e.g., 'Waze'). As explained above, at least one data extraction submodule 251 may analyze the textual traffic property data by any appropriate text analysis algorithm as known in the art (e.g., a normal language processing (NLP) based algorithm), to extract contextual data relating to traffic in at least one road segment and determine whether the data indicates a condition of a traffic congestion. Statistical analysis module 50 may determine whether this type of information (e.g., a textual report of heavy traffic) indicates a condition of traffic congestion and cross reference it with a geo-location of the user (e.g., via location of a cellular base station and/or GPS-based location), to match or correlate the congestion with a specific road segment. Statistical analysis module 50 may determine whether the identified congestion is a first occurrence of a congestion at the respective segment and/or timestamp bin, hereinafter referred to as a "first-time" occurrence.

For example, statistical analysis module 50 may determine that the congestion condition is a historical first-time occurrence, a first-time within a predefined period and the like. Statistical analysis module 50 may propagate an indication of the first-time congestion, as a textual-related severity rate 64 (e.g., 64D) to scoring module 60 for further analysis.

In yet another example, statistical analysis module 50 may receive (e.g., from data extraction module 25) time-based (e.g., associated with a specific timestamp bin), spatial (e.g., associated with a specific road segment) traffic property data originating from one or more online numeric data sources 230. This data may include, for example: data such as travel duration per specific road segments, from navigation applications (e.g., Google maps, Waze, etc.); and data such as travel duration per specific road segments, from a Transportation Management Center (TMC). As explained above, at least one data extraction submodule 251 may extract the numeric data (e.g., travel duration through a specific road segment), and statistical analysis module 50 may analyze the numerical data to determine whether this type of information (e.g., a long duration of travel) indicates a condition of traffic congestion at the respective location. Statistical analysis module 50 may identify whether the determined congestion is a first-time occurrence of a congestion at the respective location or geographical segment and propagate an indication of the first-time congestion as a numeric-related severity rate 64 (e.g., 64E) to scoring module 60 for further analysis.

According to some embodiments, scoring module 60 may receive (e.g., from a user, via an input device such as element 7 of FIG. 1) at least one set of data elements including at least one initial weight value 61A and/or at least one initial threshold value 71A.

Scoring module 60 may maintain a scoring table 610, attributing at least one score or rating to at least one traffic property, per each road segment, as explained herein. Scoring table 610 may be implemented as any suitable data structure known in the art (e.g., a linked list, a relational database, and the like) and may be stored on any suitable data storage module as known in the art (e.g., element 6 of FIG. 1).

Scoring module 60 may update scoring table 610 according to an occurrence of at least one event, including for example: a real world event that may be manifested as a new data input from statistical analysis module 50 (e.g., a change in a value of a severity rate 64A through 64F), a change in a configuration, such as a change in at least one weight or threshold value, a change in a property of a road segment (e.g., a change in a granularity definition), and the like. Additionally, or alternately, scoring module 60 may repeatedly or periodically update scoring table 610 (e.g., at a lapse of a time-bin period).

Scoring table 610 may attribute, per each road segment at least one score to each respective traffic property. For example, scoring module 60 may receive (e.g., form statistical analysis module 50, as elaborated above) at least one severity rate 64 (e.g. 64A through 64F) relating to a statistical characteristic of a specific road segment (e.g., segment ID #1). As elaborated above, severity rate 64 may relate to values of statistical characteristics (e.g., a historical minimum, a GMM severity rate, a z-score severity rate, etc.) per respective traffic properties (e.g., velocity, number of vehicles, etc.).

As explained elsewhere, system 10 may receive data associated with at least one traffic property (e.g., velocity of traffic) at a specific road segment (e.g., segment ID #1), from one or more data sources 20. At least one data extraction submodule 251 may extract relevant data (e.g., data relating to traffic velocity in road segment ID #1) from the one or more data sources 20. Slot-sorting module 40 may associate the extracted data from the one or more sources to a respective slot (e.g., a velocity slot), representing a respective traffic property (e.g., traffic velocity). The data in the slot may be analyzed by statistical analysis module 50 according to one or more statistical characteristics (e.g., GMM characteristics, Z-score characteristics. Min/Max characteristics, etc.), to obtain, at least one respective severity rate 64 (e.g., a GMM-related severity rate, a z-score related severity rate, a Min/Max-related severity rate, etc.).

In some embodiments, scoring module 60 may compare the value of each severity rate 64 with a respective initial threshold value 71A, to filter out conditions in which the severity rate 64 does not necessarily portray a condition of a real-life traffic congestion. For example, data in a velocity slot that may indicate slow traffic, that has only arrived from very few (e.g. a single) data source(s) (e.g., a bluetooth, on-road detector 210) may be considered unreliable, and hence be filtered-out or removed.

In some embodiments, scoring module 60 may apply a weight to one or more severity rates 64 relating to respective statistical characteristic of a traffic property. For example, scoring module 60 may assign a high weight value 61 (e.g., 61-A) to a severity rate (e.g., a historical maximal number of vehicles at a specific road segment) that they may regard as accurate, decisive, and reliable, and a low weight value 61 (e.g., 61-B) to a severity rate that they may consider less reliable (e.g., a first-time mention of slow traffic at the same road segment, on an online textual correspondence in a social network data source 240).

Scoring module 60 may aggregate or accumulate the severity rates 64 according to their respective weights and threshold values to an overall weighted, accumulated score 63. Scoring module 60 may compare the overall, weighted, accumulated score 63 with a predefined threshold. If the overall score surpasses the predefined threshold, scoring module 60 may identify the data as originating from a traffic congestion.

System 10 may include a pooling module 70. Pooling module may be adapted to detect whether an accumulated score or rating (e.g., that may normally indicate a traffic congestion on Monday morning) indicates an exceptionally congested condition (e.g., caused by an unexpected condition such as a traffic accident), and produce an outlier indication 73 accordingly. For example, pooling module 70 may compare the accumulated score to a predefined threshold 71, to determine whether the accumulated score indicates a traffic congestion outlier.

Pooling module 70 may be configured to update at least one weight or rating and/or threshold, to identify or single-out a condition of a traffic congestion outlier. In some embodiments, the thresholds and weights may be dynamically calculated and updated, to detect a congestion outlier, and produce an indication 73 of such condition as described herein. For example, pooling module 70 may receive form scoring module 60 at least one score associated with a statistical characteristic (e.g., a GMM-related severity rate 64 multiplied by a respective weight) of a traffic property (e.g., traffic velocity) of a specific road segment at a specific timestamp bin (e.g., non-holiday Monday, 08:00-08:10).

Pooling module 70 may provide at least one weight feedback 61B and/or threshold feedback 71B to respectively update at least one weight 61 and/or threshold 71, so as to extract conditions of traffic congestion outliers. In some embodiments, pooling module 70 may produce least one weight feedback 61B and/or threshold feedback 71B according to a supervised input (e.g., form a user, via input module 7 of FIG. 1). For example, a user may determine that at least one severity rate associated with a statistical characteristic (e.g., a z-score) of a specific traffic property (e.g., number of events in which drivers have pressed the brake pedal) during a specific timestamp bin and at a specific road segment poorly represents a condition of congestion and may decrease the weight respective to that severity rate accordingly.

Additionally, or alternately, pooling module 70 may receive a supervised input (e.g., from a user via input module 7 of FIG. 1, or from an external source such as a TMC) regarding the existence of a traffic congestion. Pooling module 70 may be adapted to train a machine-learning (ML) model 72, to predict or identify a condition of a traffic congestion outlier, according to at least one of: the supervised input, a severity rate, and a timestamp (e.g., time of day, day of week, etc.).

Reference is now made to FIG. 9, which is a block diagram, depicting an offline post processing module that may be included in a system for detecting and quantifying irregular traffic congestion, according to some embodiments.

The term "congestion factor" may be used herein to refer to any cause or reason for a formation of a vehicle traffic or road congestion, including for example: a traffic light that is poorly synchronized or out of order, a traffic accident that may have occurred, improper road signage, improper allocation of traffic lanes, etc.

Post-processing module 80 may receive from pooling module 70 a plurality of outlier indications 73 of road segments that have been identified as being irregularly congested, e.g., having a condition of a congestion outlier. Post-processing module 80 may analyze the congestion (e.g., the plurality of outlier indications 73) to determine the effect of at least one congestion factor on the congestion of traffic in that's factors vicinity.

For example, post-processing module 80 may determine the effect of a specific, poorly synchronized traffic light on traffic through an urban center. This analysis may relate to at least one of a spatial influence and time-wise influence of the congestion factor on traffic, as explained herein.

According to some embodiments, post-processing module 80 may include a spatial outlier clustering module 81, configured to group or cluster a plurality of road segments identified as having a condition of a congestion outlier (e.g., received as outlier indications 73 from pooling module 70) to a plurality of spatial clusters according to their spatial location, at a given time (e.g. within a specific baseline timestamp bin). For example, each spatial cluster may include one or more irregularly congested road segments, geographically located at a predefined proximity to at least one other irregularly congested road segment.

According to some embodiments, post-processing module 80 may assign a cluster score to each cluster, according to at least one severity rate 64 of member congested segments. For example, post-processing module 80 may accumulate one or more accumulated scores 62 of a plurality of member congested segments, to form a congestion score, indicating a severity of the traffic congestion outlier at road segments of the respective spatial cluster.

According to some embodiments, post-processing module 80 may produce a traffic congestion report 251 that may include a geographic representation of the plurality of clustered segments and the clusters' respective cluster score.

Congestion report 251 may be analyzed by administrative users to identify week spots in traffic planning.

According to some embodiments, post-processing module 80 may include a time-based outlier clustering module 82, configured to receive one or more spatial clusters of spatial clustering module 81, and group the spatial clusters to form a time-based cluster model of spatial clusters. Congestion cluster analysis module 90 may analyze each such time-based cluster to determine the evolution of an outlier congestion condition over time within the region of interest (ROI).

For example, assuming a congestion outlier occurred at time T. Spatial outlier clustering module 81 may group segment IDs 1, 2 and 3 to produce a first spatial cluster (SC1) pertaining to time T.

Further assuming that the congestion has moved such that at time T+1 a congestion outlier was detected at segment IDs 2, 3, 4 and 5. Spatial outlier clustering module 81 may group road segment IDs 2, 3, 4 and 5 to produce a second spatial cluster (SC2) pertaining to time T+1. Time-based clustering module 82 may produce a time-based cluster (TC1), showing an overall duration of traffic congestion over timestamp bins T and T+1, in other words, congestion analysis module 90 may identify the congestion as: having started at time T, having lasted at least until time T+1, and evolved in a certain manner (e.g., segment ID 1, 2 and 3 to segment ID 2, 3, 4 and 5).

According to some embodiments, post-processing module 80 may include the evolution of at least one time-based cluster in congestion report 251, to enable administrative users to analyze the evolution of congestion outliers to further identify weak spots in traffic planning. For example, congestion report 251 that may include an evolution of a traffic jam over time and space may be sent to respective personnel (e.g., road engineers and city planners) as insight to improve or mitigate the effect of at least one congestion factor on the traffic in a region of interest.

As explained above, embodiments of the present invention may produce one or more action recommendation according to spatial clustering of traffic congestion outliers. The recommendation may include at least one data element corresponding to a condition of a local, temporal traffic congestion outlier, such as a location of a geographical location corresponding to a spatial cluster, an origin of a time-based cluster (indicating for example where a source of a congestion factor may be), a cluster score (indicating a severity of a congestion outlier condition), etc.

For example, embodiments of the present invention may be integrated with one or more closed-circuit television cameras (CCTVs) that may be located at specific ROIs (e.g., road segments at important traffic crossroads). Embodiments may prompt a user's attention to a condition of a congestion outlier as a recommendation 250 for action. The user may subsequently detect a source of traffic irregularity using the one or more integrated CCTV cameras according to the prompt (e.g., according to the at least one data element corresponding to the traffic congestion outlier).

In another example, recommendation 250 may be sent (e.g., via a cellular communication network) to for example at least one of a freeway service patrol or a police patrol, or other authorities. The recommendation 250 may include an assignment of a task or task list to the patrol force, according to specific characteristics of the congestion outlier (e.g., to regulate traffic and/or attend to a congestion factor).

In another example, recommendation 250 may be sent to a dynamic message signage (DMS) system and may include a warning and/or an instruction public (e.g., use alternative routes of traffic).

According to some embodiments, congestion analysis module 90 may include at least one machine-learning (ML) model 92 as known in the art, including for example a supervised convolutional neural network (CNN) model, that may be trained to predict a condition of at least one road segment given an identification at least one traffic congestion outlier. For example, congestion analysis module 90 may store historical information relating to at least one spatial cluster (e.g., SC1 and SC2 of the above example) and/or at least one time-based cluster (e.g., TC1 of the above example), to train ML model 92 to predict an existence of at least one time-based cluster, associated with the expected evolvement of the congestion.

In some embodiments, congestion analysis module 90 may receive at least one feedback element (e.g., from a supervising user) pertaining to a condition of a road segment (e.g., existence of a traffic congestion in that segment), to train the at least one machine learning model as known in the art.

Figure 10:
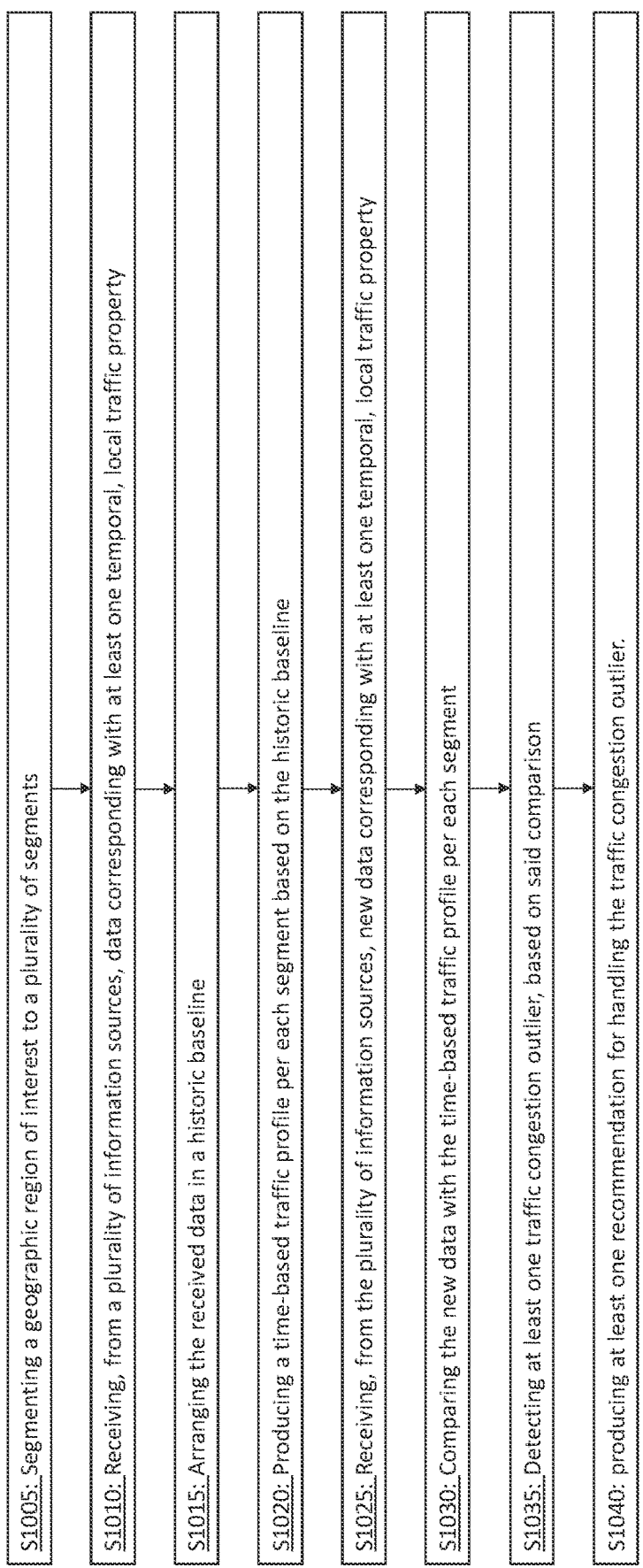
FIG. 10 is a flow diagram, depicting a method of detecting and quantifying irregular traffic congestion, according to some embodiments.

Reference is now made to FIG. 10, which is a flow diagram, depicting a method of detecting and quantifying irregular traffic congestion by at least one processor, according to some embodiments.

As shown in step S1005, the processor may segment a geographic region of interest to a plurality of segments As shown in step S1010, the processor may receive, from a plurality of information sources, data corresponding to at least one temporal, local (e.g., relating to a specific road segment) traffic property. For example, at least one information source may be one of: an on-road detector, an in-vehicle detector, an online textual data source and an online numeric data source.

As shown in step S1015, the processor may arrange the received data in a historic baseline As shown in step S1020, the processor may produce a time-based traffic profile per each segment based on the historic baseline As shown in step S1025, the processor may receive, from the plurality of information sources, new data corresponding to at least one temporal (e.g., relating to a specific timestamp bin), local (e.g., relating to a specific road segment) traffic property As shown in step S1030, the processor may compare the new data with the time-based traffic profile per each segment As shown in step S1035, the processor may detect at least one traffic congestion outlier, based on said comparison As shown in step S1040, the processor may produce at least one recommendation for handling the traffic congestion outlier.

Embodiments of the present invention may include several improvements over methods and systems of traffic control and traffic planning, as known in the art.

For example, embodiments may include an aggregation data from a plurality of unrelated input sources (e.g., on-road sources 210, in-vehicle sources 220, Numerical 230 and textual 240 sources) to produce traffic related data. The data of the different sources may then be synchronized, both time-wise (e.g., relating to specific timestamp bins) and location-wise (e.g., relating to specific road segments) to produce a map of traffic congestion from the unrelated sources. Moreover, the traffic information may be extracted from different types of data relating to different aspects of traffic, including for example: vehicle velocity, driver behavior, number of vehicles etc. This information may be included in a practical application for drivers, law enforcement personnel and traffic control centers.

In another example, in contrast to state-of-the-art systems that may be adapted to report traffic congestion without relation to historical traffic profiles of road segments, embodiments of the present invention may provide a unique method for analyzing and reporting on special conditions of traffic congestion, herein related to as traffic congestion outliers. Such information may be included in practical applications that may single-out congestion factor- and may identify conditions that may require immediate intervention.

In yet another example, embodiments of the present invention may provide a unique method for analyzing and reporting on evolution of traffic congestion conditions. Such information may be analyzed by practical applications to obtain insight on correlation and/or effect of a first traffic condition at a first road segment on a second traffic condition at a second road segment (e.g., a time-wise effect of a short green light on adjacent road crossings). This insight may be used by traffic planners to plan and/or improve transportation conditions.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of detecting and handling traffic congestion outliers by at least one processor, the method comprising:
   receiving, from a plurality of information sources, data corresponding to at least one temporal, local traffic property;
   producing a local, time-based traffic profile based on the received data, wherein the local, time-based traffic profile reflects historic states of the at least one temporal, local traffic property;
   receiving, from at least one information source, new data corresponding to the at least one temporal, local traffic property;
   generating a score for the new data by:
      comparing the new data to the local, time-based traffic profile so as to generate one or more severity rates, each severity rate corresponding to exactly one of the at least one temporal, local traffic property,
      assigning a weight to each severity rate, and
      accumulating the one or more severity rates according to the respective weights, to produce an overall accumulated weighted score as the score;
   if the score surpasses a threshold, then identifying the data as originating from a local, temporal traffic congestion outlier;
   clustering a plurality of segments identified as having a traffic congestion outlier to a plurality of clusters;
   assigning a cluster score to each cluster, according to at least one severity rate of member congested segments;
   producing a traffic report, comprising a geographic representation of the plurality of clustered segments and the clusters' respective cluster score; and
   transmitting a recommendation to a user device, based on the traffic report, wherein the recommendation includes at least one of: a geographic location of a cluster of the plurality of clusters, a time-based origin of the cluster, and a cluster score of the cluster.

2. The method of claim 1, further comprising segmenting a geographic region of interest (ROI) to a plurality of segments based on a granularity parameter, and wherein producing a local, time-based traffic profile comprises:
   arranging the received data in a plurality of historic baselines, each associated with a specific segment; and
   producing a time-based traffic profile per each segment based on the respective historic baseline.

3. The method of claim 2, wherein arranging the received data in a historic baseline comprises:
   fragmenting time to a plurality of discrete timestamp bins of a predefined duration;
   synchronizing the temporal traffic property data of the plurality of information sources according to the discrete timestamp bins; and
   aggregating data from the plurality of information sources into respective timestamp bins.

4. The method of claim 2, wherein producing a time-based traffic profile per each segment comprises:
   computing one or more values of one or more statistical parameters of the one or more traffic properties; and
   aggregating the computed one or more values to produce a time-based profile, representing a normal evolution of the traffic property over time per a specific segment.

5. The method of claim 1, further comprising comparing the accumulated weighted score to a threshold, to identify a road segment as having a congestion outlier.

6. The method of claim 5, wherein computing one or more values of one or more statistical parameters comprises:
   producing a distribution histogram of the at least one traffic property, over the plurality of discrete timestamp bins per each segment;
   training a Gaussian Mixture Model (GMM) per each segment, based on the distribution histogram; and
   labeling each Gaussian distribution of the GMM to represent a probability of distribution of the at least one traffic property according to a timing property.

7. The method of 6, wherein producing one or more severity rates comprises:
   predicting the value of the temporal, local traffic property according to at least one GMM;
   comparing the value of the traffic property of the new data with the predicted value of the traffic property; and
   producing a first severity rate of the temporal, local traffic property based on the comparison.

8. The method of claim 1, wherein producing one or more severity rates comprises:
   producing a Gaussian distribution function of the at least one local, temporal traffic property per each segment and per each timestamp bin;
   calculating the difference between the new data value and the mean value of the Gaussian distribution function in z-score units; and
   producing a second severity rate based on the calculation.

9. The method of claim 1, wherein producing one or more severity rates comprises:
   calculating a historical extremum value of the at least one local, temporal traffic property per each segment and per each timestamp bin;
   comparing the new data value with the calculated historical extremum value; and
   producing a third severity rate based on the comparison.

10. The method of claim 1, wherein the new data is an indication of a driver behavior within a specific segment and timestamp bin, and wherein producing one or more severity rates comprises:

counting occurrences of indications of driver behavior; and producing a forth severity rate based on the count.

11. The method of claim 1, wherein the new data comprises textual traffic property data originating from at least one online textual data source, and wherein producing one or more severity rates comprises:

analyzing the textual data to determine whether the data indicates a condition of a traffic congestion;

cross referencing the analyzed data with geo-location data of the user;

determining if the congestion is a historical first-time occurrence of a congestion at the user's location; and if the congestion is a historical first-time occurrence of a congestion at the user's location then producing a fifth severity rate.

12. The method of claim 1, wherein the new data comprises numerical traffic property data originating from one or more online numerical data sources, and wherein producing one or more severity rates comprises:

extracting the numerical data;

analyzing the numerical data to determine whether the numerical data indicates a condition of a traffic congestion at a specific location;

identifying whether the determined congestion is a first-time occurrence of a congestion at the respective location; and if the congestion is a historical first-time occurrence of a congestion at the respective location then producing a sixth severity rate.

13. The method of claim 1, further comprising:

clustering the plurality of clusters to form a time-based cluster model of clusters; and analyzing each such time-based cluster to determine an evolution of an outlier congestion condition over time, wherein the congestion report further comprises the evolution of at least one time-based cluster.

14. The method of claim 1, wherein the plurality of information sources comprises at least one physical roadway detector selected from a list comprising one or more of: an induction loop, a radar, an infrared camera, a still camera, a video camera, a Light Detection and Ranging (LIDAR) sensor, a pneumatic sensor, a piezoelectric sensor, a magnetic sensor, an acoustic sensor, a doppler microwave sensor and a Bluetooth receiver.

15. The method of claim 1, wherein the plurality of information sources comprises at least one in-vehicle sensor selected from a list comprising one or more of: a geo-location sensor, a collision detector and a proximity detector.

16. The method of claim 1, wherein the plurality of information sources comprises a textual traffic report in a social network, and wherein the method further comprises extraction of data relating to traffic congestion from the textual traffic report.

17. The method of claim 1, wherein the recommendation comprises a prompt for a user's attention to a condition of a congestion outlier, and wherein the method further comprises detecting a source of traffic irregularity using one or more integrated CCTV cameras according to the prompt.

18. The method of claim 1, further comprising sending the recommendation via a cellular communication network to at least one of a freeway service patrol and a police patrol, and wherein the recommendation comprises an assignment of a task or task list to the patrol force, according to specific characteristics of the congestion outlier.

19. The method of claim 1, further comprising sending the recommendation to a dynamic message signage (DMS) system and wherein the recommendation comprises a warning and/or an instruction to the public.

20. The method of claim 1, further comprising training a neural network to predict at least one condition of at least one road segment given an identification of at least one traffic congestion outlier.

21. A system for detecting traffic congestion outliers, the system comprising a non-transitory memory device comprising instruction code stored thereon, and a processor associated with the memory device, and configured to execute the instruction code, where upon execution of said instruction code the processor is configured to:

receive, from a plurality of information sources, data corresponding to at least one temporal, local traffic property;

produce a local, time-based traffic profile based on the received data, wherein the local, time-based traffic profile reflects historic states of the at least one temporal, local traffic property;

receive, from at least one information source, new data corresponding to the at least one temporal, local traffic property;

generate a score for the new data by:

comparing the new data to the local, time-based traffic profile so as to generate one or more severity rates, each severity rate corresponding to exactly one of the at least one temporal, local traffic property, assigning a weight to each severity rate, and accumulating the one or more severity rates according to the respective weights, to produce an overall accumulated weighted score as the score;

if the score surpasses a threshold, then identify the data as originating from a local, temporal traffic congestion outlier;

cluster a plurality of segments identified as having a traffic congestion outlier to a plurality of clusters;

assign a cluster score to each cluster, according to at least one severity rate of member congested segments;

produce a traffic report, comprising a geographic representation of the plurality of clustered segments and the clusters' respective cluster score; and transmit a recommendation to a user device, based on the traffic report, wherein the recommendation includes at least one of: a geographic location of a cluster of the plurality of clusters, a time-based origin of the cluster, and a cluster score of the cluster.

\* \* \* \* \*